United States Patent
Takemura et al.

(10) Patent No.: US 6,885,132 B2
(45) Date of Patent: Apr. 26, 2005

(54) CONTROL APPARATUS FOR VIBRATION TYPE ACTUATOR, VIBRATION TYPE ACTUATOR SYSTEM, AND METHOD FOR CONTROLLING VIBRATION TYPE ACTUATOR

(75) Inventors: Kenjiro Takemura, Kanagawa (JP); Shinji Yamamoto, Kanagawa (JP); Nobuyuki Kojima, Tokyo (JP); Takashi Maeno, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 8 days.

(21) Appl. No.: 10/669,429

(22) Filed: Sep. 25, 2003

(65) Prior Publication Data

US 2004/0124742 A1 Jul. 1, 2004

(30) Foreign Application Priority Data

Oct. 7, 2002 (JP) .................................... 2002-293437

(51) Int. Cl.$^7$ ............................................ H01L 41/08
(52) U.S. Cl. ............................ 310/316.01; 310/316.02; 310/323.02
(58) Field of Search ........................ 310/316.01, 316.02, 310/317, 319, 323.02

(56) References Cited

U.S. PATENT DOCUMENTS 5,625,145 A    4/1997  Maeno et al. ............. 73/504.12
5,760,528 A *  6/1998  Tomikawa ................ 310/323.02
6,215,224 B1   4/2001  Kataoka et al. ......... 310/316.02
6,229,402 B1   5/2001  Kataoka et al. ................ 331/34
6,404,104 B1   6/2002  Maeno et al. ........... 310/323.02
6,765,335 B2 * 7/2004  Wischnewskiy ........ 310/323.02
2002/0149301 A1 10/2002  Maruyama et al. ......... 310/366

FOREIGN PATENT DOCUMENTS

JP    11-164576    6/1999
JP    11-220891    8/1999
JP    11-220892    8/1999

* cited by examiner

*Primary Examiner*—Mark Budd
(74) *Attorney, Agent, or Firm*—Fitzpatrick, Cella, Harper & Scinto

(57) ABSTRACT

A control apparatus for a vibration type actuator is disclosed, with which at least three kinds of vibrations are excited, and a desired motion can be carried out with high efficiency. The vibration type actuator includes a rotatable moving member, an elastic member contacting the moving member, and an electro-mechanical energy conversion element exciting at least three different kinds of vibrations in the elastic member by supplying at least three periodic signals having different phases. The control apparatus includes a rotation axis determining unit, a parameter determining unit and a control circuit. The rotation axis determining unit determines a rotation axis for rotating the moving member. The parameter determining unit determines, by using an inverse model, phase and amplitude of the periodical signals.

15 Claims, 17 Drawing Sheets

PROJECTION ONTO x-y PLANE

PROJECTION ONTO y-z PLANE

PROJECTION ONTO z-x PLANE

FIG.10

| SIGN OF x-COMPONENT | SIGN OF y-COMPONENT | PHASE DIFFERENCE $\phi_{xy}$ | PHASE DIFFERENCE $\phi_{xz}$ |
|---|---|---|---|
| + | + | $\pi$ | $\pi/2$ |
| + | − | 0 | $-\pi/2$ |
| − | + | 0 | $\pi/2$ |
| − | − | $\pi$ | $-\pi/2$ |

FIG.11

| STATE NUMBER | CLASS | SUB-CLASS | SIGN OF EACH COMPONENT OF ROTATION AXIS VECTOR | | | COMPONENT WITH MAXIMUM ABSOLUTE VALUE | PHASE φ [rad] | | | AMPLITUDE RATIO rAmp | | |
|---|---|---|---|---|---|---|---|---|---|---|---|---|
| | | | x-AXIS | y-AXIS | z-AXIS | | $\phi_x$ | $\phi_y$ | $\phi_z$ | $Amp_x$ | $Amp_y$ | $Amp_z$ |
| 1 | 1 | 1 | + | + | − | x | $-\pi/2 \sim 0$ | $\pi/2$ | 0 | $1 \sim 2$ | 1 | 1 |
| 2 | | 2 | | | | y | 0 | $\pi/2 \sim \pi$ | $\pi/2$ | 1 | $1 \sim 2$ | 1 |
| 3 | | 3 | | | | z | 0 | $\pi/2$ | $0 \sim \pi/2$ | 1 | 1 | $1 \sim 2$ |
| 4 | 2 | 1 | + | − | + | x | $\pi/2 \sim \pi$ | $\pi/2$ | 0 | $1 \sim 2$ | 1 | 1 |
| 5 | | 2 | | | | y | $\pi/2$ | $0 \sim \pi/2$ | 0 | 1 | $1 \sim 2$ | 1 |
| 6 | | 3 | | | | z | $\pi/2$ | 0 | $-\pi/2 \sim 0$ | 1 | 1 | $1 \sim 2$ |
| 7 | 3 | 1 | + | − | − | x | $0 \sim \pi/2$ | $\pi/2$ | 0 | $1 \sim 2$ | 1 | 1 |
| 8 | | 2 | | | | y | 0 | $\pi/2 \sim \pi$ | 0 | 1 | $1 \sim 2$ | 1 |
| 9 | | 3 | | | | z | 0 | 0 | $-\pi/2 \sim 0$ | 1 | 1 | $1 \sim 2$ |
| 10 | 4 | 1 | − | + | + | x | $0 \sim \pi/2$ | 0 | $\pi/2$ | $1 \sim 2$ | 1 | 1 |
| 11 | | 2 | | | | y | 0 | $-\pi/2 \sim 0$ | $\pi/2$ | 1 | $1 \sim 2$ | 1 |
| 12 | | 3 | | | | z | 0 | 0 | $\pi/2 \sim \pi$ | 1 | 1 | $1 \sim 2$ |
| 13 | 5 | 1 | − | + | − | x | $-\pi/2 \sim 0$ | 0 | $\pi/2$ | $1 \sim 2$ | 1 | 1 |
| 14 | | 2 | | | | y | 0 | $0 \sim \pi/2$ | $\pi/2$ | 1 | $1 \sim 2$ | 1 |
| 15 | | 3 | | | | z | 0 | $\pi/2$ | $\pi/2 \sim \pi$ | 1 | 1 | $1 \sim 2$ |
| 16 | 6 | 1 | − | − | + | x | $\pi/2 \sim \pi$ | 0 | $\pi/2$ | $1 \sim 2$ | 1 | 1 |
| 17 | | 2 | | | | y | $\pi/2$ | $-\pi/2 \sim 0$ | 0 | 1 | $1 \sim 2$ | 1 |
| 18 | | 3 | | | | z | $\pi/2$ | 0 | $0 \sim \pi/2$ | 1 | 1 | $1 \sim 2$ |
| 19 | 7 | 1 | + | − | − | x | $-\pi \sim -\pi/2$ | $\pi/2$ | 0 | $1 \sim 2$ | 1 | 1 |
| 20 | | 2 | | | | y | $\pi/2$ | $-\pi \sim -\pi/2$ | 0 | 1 | $1 \sim 2$ | 1 |
| 21 | | 3 | | | | z | $-\pi/2$ | 0 | $-\pi \sim -\pi/2$ | 1 | 1 | $1 \sim 2$ |
| 22 | 8 | 1 | − | − | − | x | $\pi/2$ | $-\pi/2$ | 0 | $1 \sim 2$ | 1 | 1 |
| 23 | | 2 | | | | y | 0 | $-\pi/2 \sim \pi$ | $-\pi/2$ | 1 | $1 \sim 2$ | 1 |
| 24 | | 3 | | | | z | $-\pi/2$ | 0 | $-\pi/2 \sim \pi$ | 1 | 1 | $1 \sim 2$ |

FIG.12

| STATE NUMBER | CLASS | SUB-CLASS | SIGN OF EACH COMPONENT OF ROTATION AXIS VECTOR | | | COMPONENT WITH MAXIMUM ABSOLUTE VALUE | PHASE φ [rad] | | | AMPLITUDE RATIO rAmp | | |
|---|---|---|---|---|---|---|---|---|---|---|---|---|
| | | | x-AXIS | y-AXIS | z-AXIS | | $\phi_x$ | $\phi_y$ | $\phi_z$ | $Amp\_x$ | $Amp\_y$ | $Amp\_z$ |
| 1 | 1 | 1 | + | + | − | x | $-\pi/2\sim 0$ | $\pi/2$ | $0$ | $1\sim 2$ | $1$ | $1$ |
| 2 | | 2 | | | | y | $0$ | $\pi/2\sim\pi$ | $\pi/2$ | $1$ | $1\sim 2$ | $1$ |
| 3 | | 3 | | | | z | $0$ | $\pi/2$ | $0\sim\pi/2$ | $1$ | $1$ | $1\sim 2$ |
| 4 | 2 | 1 | + | − | + | x | $\pi/2\sim\pi$ | $\pi/2$ | $0$ | $1\sim 2$ | $1$ | $1$ |
| 5 | | 2 | | | | y | $\pi/2$ | $0\sim\pi/2$ | $0$ | $1$ | $1\sim 2$ | $1$ |
| 6 | | 3 | | | | z | $\pi/2$ | $0$ | $-\pi/2\sim 0$ | $1$ | $1$ | $1\sim 2$ |
| 7 | 3 | 1 | + | − | − | x | $0\sim\pi/2$ | $\pi/2$ | $0$ | $1\sim 2$ | $1$ | $1$ |
| 8 | | 2 | | | | y | $\pi/2$ | $\pi/2\sim\pi$ | $0$ | $1$ | $1\sim 2$ | $1$ |
| 9 | | 3 | | | | z | $\pi/2$ | $0$ | $-\pi/2\sim 0$ | $1$ | $1$ | $1\sim 2$ |
| 10 | 4 | 1 | − | + | + | x | $-\pi/2\sim 0$ | $0$ | $\pi/2$ | $1\sim 2$ | $1$ | $1$ |
| 11 | | 2 | | | | y | $0$ | $0\sim\pi/2$ | $\pi/2$ | $1$ | $1\sim 2$ | $1$ |
| 12 | | 3 | | | | z | $0$ | $\pi/2$ | $\pi/2\sim\pi$ | $1$ | $1$ | $1\sim 2$ |
| 13 | 5 | 1 | − | + | − | x | $\pi/2\sim\pi$ | $0$ | $\pi/2$ | $1\sim 2$ | $1$ | $1$ |
| 14 | | 2 | | | | y | $0$ | $\pi/2\sim\pi$ | $\pi/2$ | $1$ | $1\sim 2$ | $1$ |
| 15 | | 3 | | | | z | $0$ | $\pi/2$ | $0\sim\pi/2$ | $1$ | $1$ | $1\sim 2$ |
| 16 | 6 | 1 | − | − | + | x | $-\pi\sim -\pi/2$ | $-\pi/2$ | $\pi/2$ | $1\sim 2$ | $1$ | $1$ |
| 17 | | 2 | | | | y | $0$ | $-\pi/2\sim 0$ | $\pi/2$ | $1$ | $1\sim 2$ | $1$ |
| 18 | | 3 | | | | z | $\pi/2$ | $0$ | $0\sim\pi/2$ | $1$ | $1$ | $1\sim 2$ |
| 19 | 7 | 1 | + | + | + | x | $0$ | $-\pi/2$ | $\pi/2$ | $1\sim 2$ | $1$ | $1$ |
| 20 | | 2 | | | | y | $-\pi/2$ | $\pi/2\sim\pi$ | $0$ | $1$ | $1\sim 2$ | $1$ |
| 21 | | 3 | | | | z | $\pi/2$ | $0$ | $-\pi/2\sim\pi$ | $1$ | $1$ | $1\sim 2$ |
| 22 | 8 | 1 | − | − | − | x | $0, \pi/2$ | $0, \pi/2$ | $\pi/2, 0$ | $1$ | $1$ | $1$ |
| 23 | | 2 | | | | y | $0, \pi/2$ | $0$ | $\pi/2, 0$ | $1$ | $0$ | $1$ |
| 24 | | 3 | | | | z | $-\pi/2$ | $\pi/2, 0$ | $\pi/2, 0$ | $1$ | $1$ | $1$ |
| 25 | | | +, −, 0 | 0, +, − | 0, 0, + | | $0, \pi/2, 0, \pi$ | $\pi/2, 0, 3\pi/2$ | $\pi/2, 0, \pi/2, 0, \pi/2, 0$ | $0\sim 1$ | $1$ | $1$ |
| 26 | | | 0 | 0 | +, − | | | | | | | |
| 27 | | | 0 | +, − | 0 | | | | | | | |
| 28 | | | +, − | 0 | 0 | | | | | $0\sim 1$ | $0\sim 1$ | $1$ |

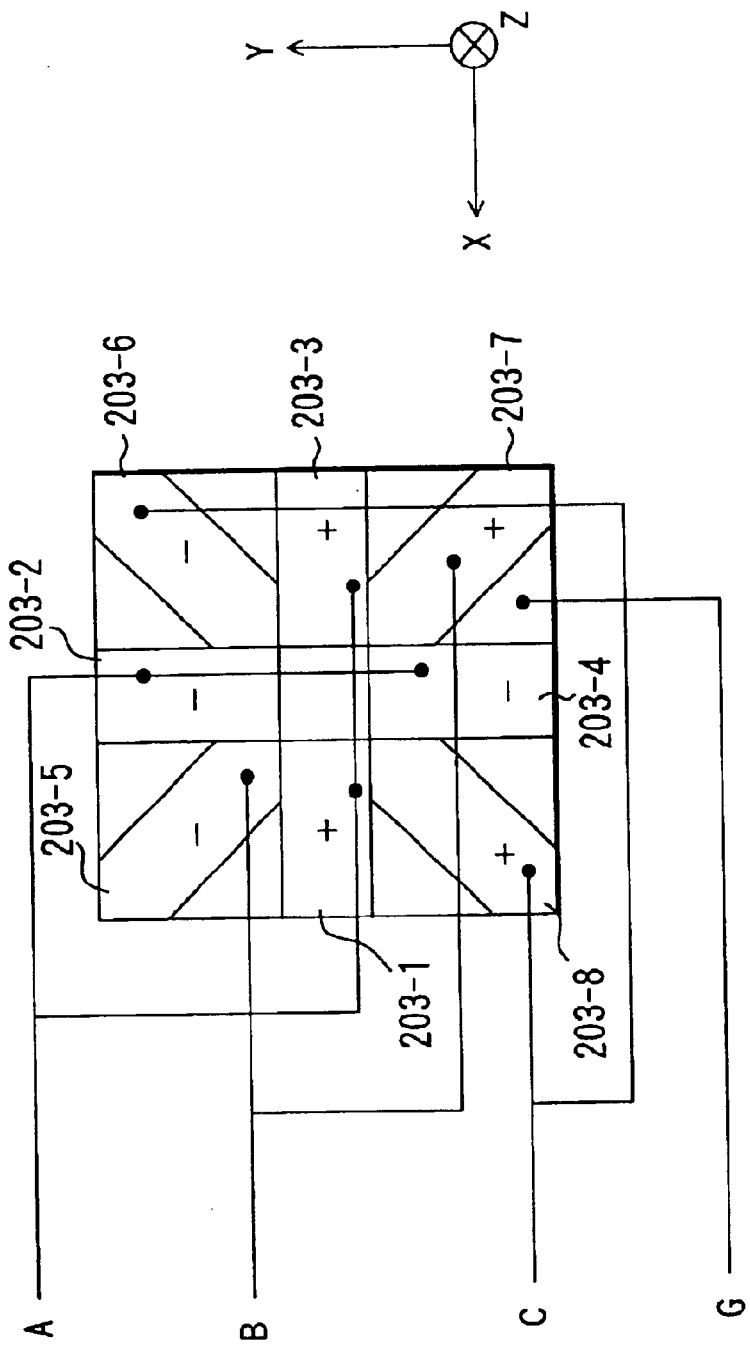

CONTROL APPARATUS FOR VIBRATION TYPE ACTUATOR, VIBRATION TYPE ACTUATOR SYSTEM, AND METHOD FOR CONTROLLING VIBRATION TYPE ACTUATOR

BACKGROUND OF THE INVENTION

1. Field of the Invention

The present invention relates to control apparatuses for vibration type actuators which drive a moving member with multiple degrees of freedom of movement by using at least three different kinds of vibration modes, as well as to such vibration type actuator systems and methods for controlling such a vibration type actuator.

2. Description of Related Art

In the past, numerous vibration type actuators, such as ultrasonic motors, have been proposed. Among these, ultrasonic motors which combine at least three kinds of vibrations to drive a moving member with multiple degrees of freedom, have been proposed.

For example, it has been proposed to form an elliptic motion in a predetermined plane by exciting in a vibration member one longitudinal vibration and two lateral vibrations, and selectively combining two of those three kinds of vibrations, and to drive a moving member contacting the vibration member with multiple degrees of freedom of movement (see for example Japanese Patent Application Laid-open No H11(1999)-164576, pp. 3–4 and FIG. 1).

Furthermore, it has been proposed to regulate the rotation axis of the moving member by regulating the phase difference of AC voltages applied to an ultrasonic motor with the above structure (see for example Japanese Patent Application Laid-open No. H11(1999)-220891, pp. 4–5 and FIG. 1).

Furthermore, it has been proposed to regulate the rotation axis of the moving member by regulating the phase differences and amplitudes of the applied AC voltages (see for example Japanese Patent Application Laid-open No. H11 (1999)-220892, pp. 5–13 and FIG. 1).

However, the above-noted conventional technology poses the following problems.

The parameters for controlling the vibration of the vibration type actuator include the driving frequencies, the voltage amplitudes and the phase differences of the applied AC voltages, but in vibration type actuators with multiple degrees of freedom of movement, in which three phases or more AC voltages are applied, there are redundancies or non-linearities in the relation between input and output, and formalization is difficult. As a result, there is the problem that the parameters for performing the desired motion efficiently cannot be determined.

SUMMARY OF THE INVENTION

It is an object of the present invention to provide a control apparatus for a vibration type actuator, as well as a vibration type actuator system and a method for controlling a vibration type actuator, with which at least three kinds of vibrations are excited, and a desired motion can be carried out with high efficiency.

One aspect of a control apparatus for a vibration type actuator according to the present invention is as follows. The vibration type actuator includes a rotatable moving member, an elastic member contacting the moving member, and an electro-mechanical energy conversion element exciting at least three different kinds of vibrations in the elastic member by supplying at least three periodic signals with different phases. The control apparatus, which supplies the periodic signals to the vibration type actuator in order to rotate the moving member to a target position, includes a rotation axis determining unit, a parameter determining unit and a control circuit. The rotation axis determining unit determines a rotation axis for rotating the moving member to the target position. The parameter determining unit determines, by using an inverse model, phases and amplitudes of the periodic signals for rotating the moving member around the rotation axis determined by the rotation axis determining unit. And the control circuit supplies to the electro-mechanical energy conversion element the periodic signals having the phases and amplitudes determined by the parameter determining unit.

A vibration type actuator system according to one aspect of the present invention includes the above-described control apparatus for a vibration type actuator, and a vibration type actuator whose drive is controlled by the periodic signals supplied from that control apparatus.

Another aspect of the present invention is as follows. A method for controlling a vibration type actuator including a rotatable moving member, an elastic member contacting the moving member, and an electro-mechanical energy conversion element exciting at least three different kinds of vibrations in the elastic member by supplying at least three periodic signals with different phases. The control method supplying the periodic signals to the vibration type actuator in order to rotate the moving member to a target position, includes a first step of determining a rotation axis for rotating the moving member to the target position; a second step of determining, by using an inverse model, phases and amplitudes of the periodic signals for rotating the moving member around the rotation axis determined in the first step; and a third step of supplying to the electro-mechanical energy conversion element the periodic signals having the phases and amplitudes determined in the second step.

These and further objects and features of the control apparatus for a vibration type actuator, the vibration type actuator system and the vibration type actuator control method of the present invention will become apparent from the following detailed description of preferred embodiments thereof taken in conjunction with the accompanying drawings.

BRIEF DESCRIPTION OF THE DRAWINGS

FIG. 10 is a table illustrating the relation between the quadrants of the rotation axis vector and the phase difference.

FIG. 11 is a table illustrating the relation of the rotation axis vector parameters to phase and amplitude ratio.

FIG. 12 is a table illustrating the relation of the rotation axis vector parameters to phase and amplitude ratio.

FIG. 17 shows the structure of the piezoelectric elements for exciting the natural vibration modes in the vibration member.

DETAILED DESCRIPTION OF THE PREFERRED EMBODIMENTS

Embodiment 1

The following is a detailed explanation of a control apparatus for a vibration type actuator, a vibration type actuator system, and a method for controlling a vibration type actuator in accordance with Embodiment 1 of the present invention.

Figure 2:
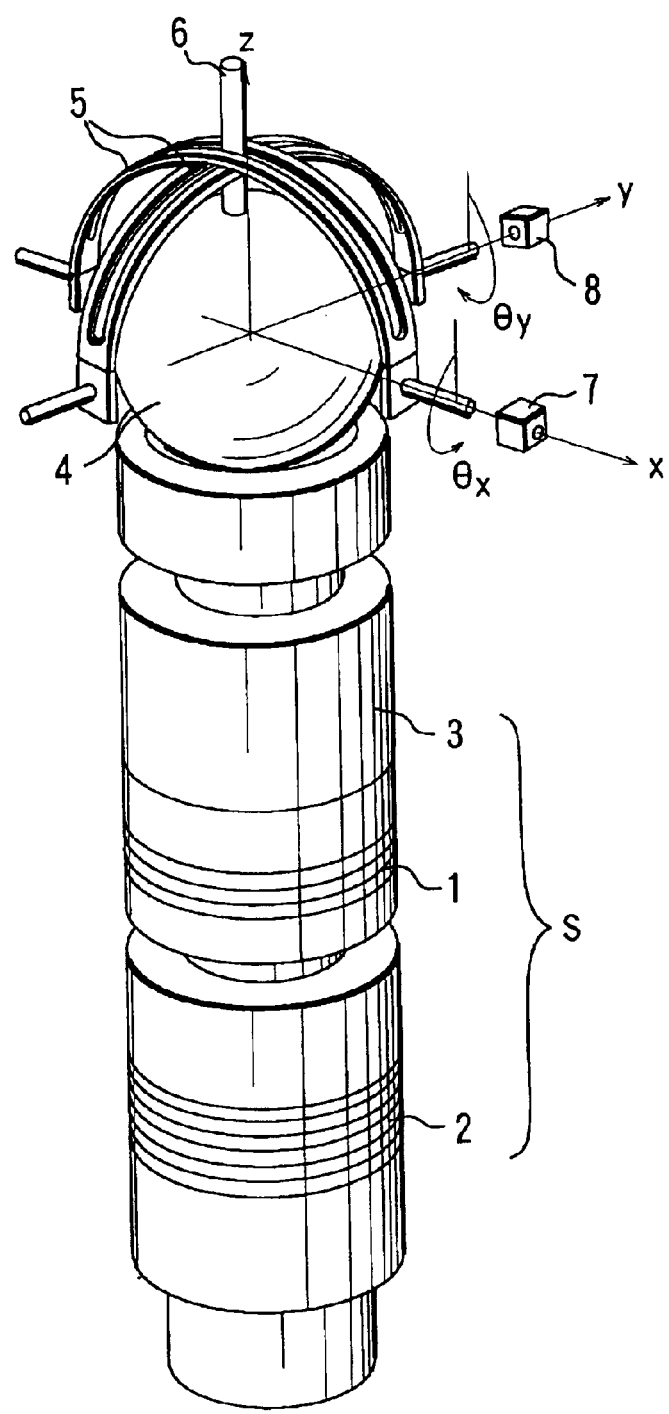
FIG. 2 is a perspective view illustrating a vibration type actuator (rod-shaped ultrasonic motor with multiple degrees of freedom of movement) in accordance with this embodiment.

FIG. 2 is a perspective view of a vibration type actuator with multiple degrees of freedom of movement in accordance with the present embodiment. This vibration type actuator is structured such that a tip portion of an output shaft 6 on a moving member 4 in contact with an elastic member 3 can be moved in any direction (that is, the moving member 4 can be rotated in any rotation direction.)

This vibration type actuator can be applied to a surveillance camera which is driven with multiple degrees of freedom of movement by attaching a camera to the output shaft 6 on the moving member 4, artificial limbs, robotic joints or robotic eyes for example.

The following is a description of the operation principle of the vibration type actuator.

In FIG. 2, reference numeral 1 denotes a piezoelectric element as an electro-mechanical energy conversion element for longitudinal vibration. The piezoelectric element 1 generates a longitudinal vibration of the elastic member 3 in the z-axis direction in the drawing due to the application (supply) of an AC voltage (periodic signal) from a driving circuit not shown in the drawings. Also reference numeral 2 denotes a piezoelectric element, but this piezoelectric element 2 is divided into two groups, one of which is used to cause in the elastic member 3 a lateral vibration in the x-axis direction in the drawing, whereas the other one is used to cause in the elastic member 3 a lateral vibration in the y-axis direction in the drawing. That is to say, by fastening these piezoelectric elements to the elastic member 3, a longitudinal vibration in the z-axis direction and lateral vibrations in the x-axis direction and the y-axis direction can be caused in the elastic member 3.

A vibration member S constituted by the piezoelectric elements 1 and 2 and the elastic member 3 is structured such that its primary resonance frequency in the longitudinal direction substantially matches its secondary resonance frequency in the lateral direction. The elastic member 3 can be caused to undergo an elliptic motion by applying three AC voltages with different phases having the same frequency near the resonance frequency to the piezoelectric element 1 and the piezoelectric element 2, which is made of two groups. The direction of this elliptic motion can be changed by adjusting the phase differences and the amplitudes of the AC voltages. As a result, the moving member 4 can be caused to undergo a rotational motion around a desired rotation axis.

Reference numerals 7 and 8 are potentiometers, which are used to detect the position of the moving member 4 in the control of the vibration type actuator. The potentiometer 7 is used to detect the rotational amount around the x-axis in FIG. 2, whereas the potentiometer 8 is used to detect the rotational amount around the y-axis in FIG. 2. Reference numeral 5 denotes arch-shaped guides that transmit the rotational amount of the moving member 4 to the potentiometers 7 and 8.

Figure 1:
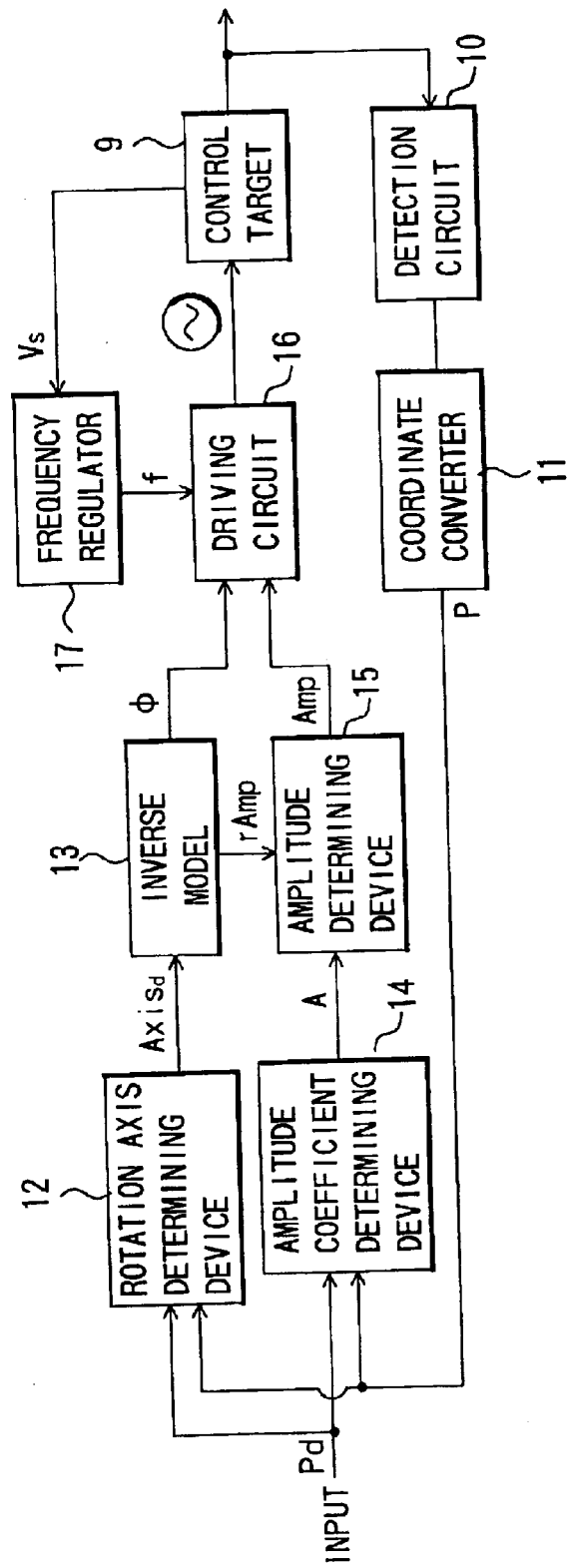
FIG. 1 is a functional block diagram showing the structure of a control apparatus used in Embodiment 1 of the present invention.

FIG. 1 is a functional block diagram showing the structure of a control apparatus used in this embodiment. In this embodiment, the object is to move the position of a point at th tip of the output shaft 6 of the vibration type actuator shown in FIG. 2 to a target position.

As for a summarized explanation of the structure of the control apparatus, a rotation axis $Axis_d$ (which is vector quantity) of the moving member 4 is determined by a rotation axis determining device 12 which determines the rotation axis for driving the moving member 4 to a target position, based on target position information $P_d$ (vector quantity) representing the target position and detected position (current position) information P (which is a vector quantity). The detected position information P is obtained by converting information from a detection circuit 10 by a coordinate converter 11. The detection circuit 10 is connected to the vibration type actuator, which is a control target 9. The determined rotation axis information $Axis_d$ is entered into an inverse model (parameter determining unit) 13 of the control target, and the phase difference $\phi$ (which is vector quantity) and amplitude ratios rAmp (which is vector quantity) of the three AC voltages for rotating the moving member 4 around the determined rotation axis are determined (the conditions of the driving voltage are determined).

On the other hand, based on the detected position information P and the target position information $P_d$, an amplitude coefficient determining device (amplification rate determining unit) 14 determines an amplitude coefficients (amplitude amplification rates) A (which is a scalar quantity) of the three AC voltages. By multiplying the amplitude ratio rAmp obtained from the inverse model 13 and the amplitude coefficient A, an amplitude determining device 15 determines the amplitude Amp of each three AC voltage applied to the control target 9.

By detecting the vibration state Vs of the control target 9 with a frequency regulator 17, the driving frequency f (scalar quantity) is regulated to a vicinity of the above-described resonance frequency of the vibration member S. The driving circuit (control circuit) 16 generates three AC voltages, based on the entered frequency information f, phase differences $\phi$, and amplitudes Amp, and supplies these three AC voltages to the control target (or more specifically, the piezoelectric elements 1 and 2).

The foregoing was a summarized explanation of the overall structure of the control apparatus. The following is a more detailed explanation of each block.

The detection circuit 10 for detecting the position of the moving member 4 (see FIG. 2) is attached to the vibration type actuator, which is the control target 9 in FIG. 1. The detection circuit 10 includes the potentiometers 7 and 8, which have been described with FIG. 2, and outputs two values, namely the rotation quantity around the x-axis and the rotation quantity around the y-axis of the moving member 4.

In the control of the vibration type actuator in this embodiment, spatial coordinates are treated as rectangular coordinate system. Thus, the coordinate converter 11 converts the spatial coordinates of the point at the tip of the output shaft 6 of the moving member 4 into rectangular coordinate system, based on the rotational amount around the x-axis and the rotational amount around the y-axis output from the detection circuit 10, and outputs the detected position information P as a vector quantity represented by an x-component, a y-component and a z-component. The rotation radius of the point at the tip of the output shaft 6 does not change, so that for this conversion it is possible to use the approach of converting a polar coordinate system with constant radius into an rectangular coordinate system.

Based on the detected position information P and the target position information $P_d$ of the point at the tip of the output shaft 6, the rotation axis determining device 12 determines the rotation axis vector $\text{Axis}_d$ for the shortest trajectory of the point at the tip of the output shaft 6 from the detected position (P) to the target position ($P_d$). The rotation axis vector $\text{Axis}_d$ is determined from the following Expression (1):

$$\text{Axis}_d = \frac{P \times P_d}{|P \times P_d|} \quad (1)$$

The numerator of the above expression is the outer product of the vectors P and $P_d$. Consequently, the vector obtained from this outer product is a vector that is orthogonal to both the vector P and the vector $P_d$. Furthermore, the direction of the outer product is the direction in which a right-handed screw advances when P is rotated toward $P_d$ in the direction of the small r angle to lap over $P_d$. Furthermore, in order to normalize the length of the vector to 1, the size of the outer product is taken as the denominator.

The rotation axis vector $\text{Axis}_d$ which has been determined in the above manner is input into the inverse model 13. The relation between the rotation axis and the applied voltage conditions of the vibration type actuator in this embodiment includes redundancies and non-linearities. Thus, the formalization of the relation between the rotation axis and the applied voltage conditions is difficult, and even when the rotation axis for driving has been determined, there are plural conditions of phase differences and amplitudes with which it can be realized. Furthermore, when there are plural conditions of phase differences and amplitudes realizing the same rotation axis, the efficiency may differ for each of the conditions.

Therefore, it is desirable to determine the optimum AC voltage phase differences and amplitudes for driving the moving member 4 on the desired rotation axis. In order to achieve this, the present embodiment is configured to determine the optimum AC voltage phase differences and amplitudes by using an inverse model 13 of the vibration type actuator. The following is a more detailed description of this inverse model 13.

Figure 3:
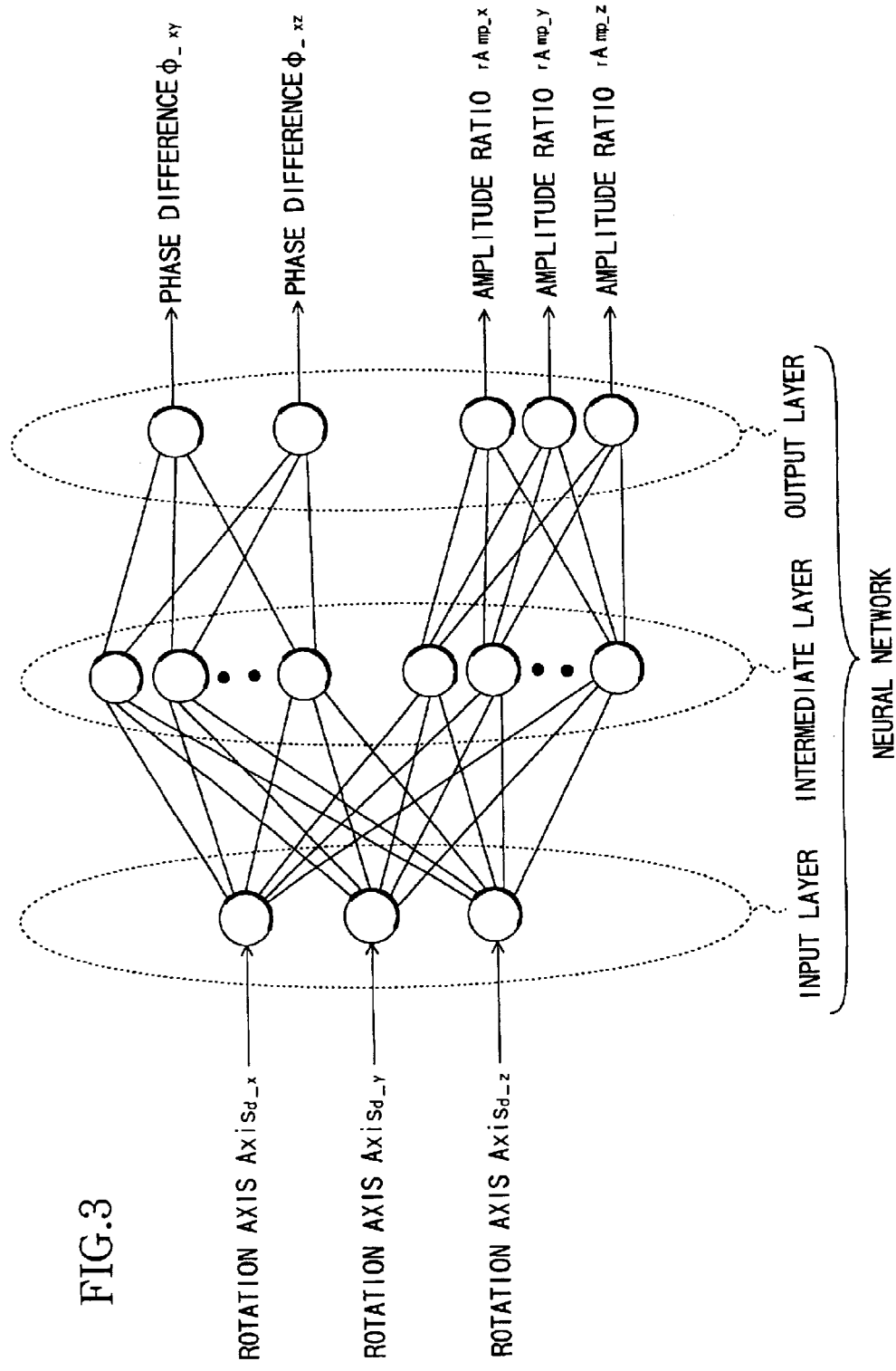
FIG. 3 is a schematic diagram of a neural network used to build an inverse model in accordance with this embodiment.

The present embodiment uses a neural network as known in the art in order to construct the inverse model 13 having the above-described functionality. The neural network used in this embodiment is made of three layers including an input layer, an intermediate layer and an output layer, as shown in FIG. 3. The x-axis direction component $\text{Axis}_{d\_x}$, the y-axis direction component $\text{Axis}_{d\_y}$, and the z-axis direction component $\text{Axis}_{d\_z}$ of the rotation axis vector $\text{Axis}_d$ determined by the rotation axis determining device 12 are entered into the input layer of the neural network.

The signals from the input layer are connected to the output layer via the intermediate layer, and two items of phase difference information and three items of amplitude information are output from the output layer. The phase difference $\phi_{\_xy}$ is the phase difference of the AC voltages which are applied to the piezoelectric element generating the vibration in x-axis direction and to the piezoelectric element generating the vibration in y-axis direction. The phase difference $\phi_{\_xz}$ is the phase difference between the AC voltages which are applied to the piezoelectric element generating the vibration in x-axis direction and to the piezoelectric element generating the vibration in z-axis direction. The amplitude ratios $r_{Amp\_x}$, $r_{Amp\_y}$, and $r_{Amp\_z}$ are the amplitude ratios of the AC voltages applied to the piezoelectric elements generating the vibration in x-axis direction, y-axis direction, and z-axis direction, respectively.

Figure 4:
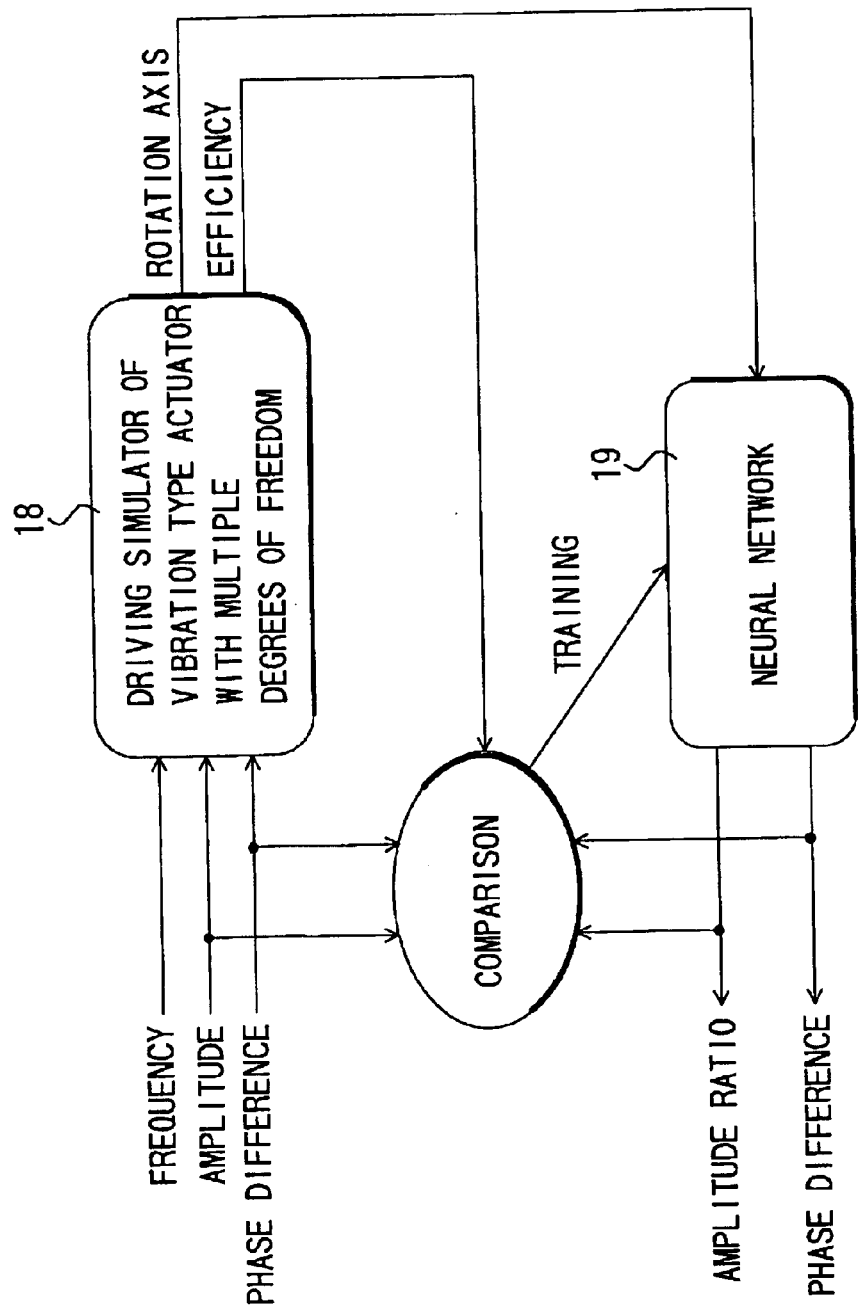
FIG. 4 is a diagram illustrating the learning process of the neural network of the inverse model of this embodiment.

The above-described neural network has previously been subjected to an optimization (a learning process), by the publicly known back propagation method, for the coupling factors between the input layer and the intermediate layer as well as between the intermediate layer and the output layer. FIG. 4 is a schematic diagram illustrating this learning process.

In this embodiment, in order to train the neural network, a driving simulator 18 is constructed as a forward model of the vibration type actuator. This model calculates the rotation axis, the rotation speed and the torque of the moving member 4 when combining the three orthogonal modes used for the vibration type actuator with given amplitudes and phases. To build the model, first, the contacts between the vibration member and the moving member 4 are modeled with a finite number of nodes and discrete linear springs connected thereto.

Then, the displacement of the nodes due to each mode is calculated for one period, based on the mode shape of the vibration member calculated by the finite element method. In this situation, when the position of the moving member 4 is taken to be fixed, and each node is taken to be displaced in accordance with the state of the linear springs, the friction force determined by this displacement amount is calculated. The friction force at each node over one period is calculated, and the rotation axis of the moving member 4 can be estimated from the average of the generated torque by the calculated friction force. Also the relation between the torque and the rotation speed around the determined rotation axis can be calculated from the friction force and the relative speed of the vibration member and the moving member 4. Thus, also the relation between the rotation speed and the sliding efficiency can be calculated.

The frequencies, amplitudes and phase differences of the applied AC voltages are entered into the driving simulator 18 for the learning process. As a result, the rotation axis and the efficiency are output from the driving simulator 18. The rotation axis is input into the neural network 19, and amplitude ratios and phase differences are output from the neural network 19. The learning process of the neural network 19 is carried out in such a manner that the amplitude ratios and phase differences determined from the amplitude entered into the driving simulator 18 match the amplitude ratios and the phase differences output from the neural network 19 as closely as possible.

As mentioned above, the relation between input and output of the vibration type actuator used in this embodiment is redundant, so that during the learning process, also the efficiency output from the driving simulator 18 is taken as a factor in the learning process. Thus, the neural network 19 is constructed, that takes also the efficiency during the driving of the vibration type actuator into consideration (that is, that determines the rotation axis such that the moving member 4 reaches the target position with a driving amount that is as small as possible).

With the process described above, the phase differences and the amplitude ratios applied to the vibration type actuator is determined, but in order to accurately position the output shaft 6 at the target position in a short time, it is necessary to perform the driving while adjusting the speed in accordance with the distance between the target position and the detected position, as is done in an ordinary positioning control. The following is a description of a method for that.

Reference numeral 14 in FIG. 1 denotes an amplitude coefficient determining device. This amplitude coefficient determining device 14 determines the amplitude coefficient A of the AC voltage applied to the vibration type actuator. The amplitude coefficient A is a coefficient that depends on the deviation of the target position information $P_d$ from the detected position information P, as described above. That is, it is determined by a rule of proportional control as shown in the following Expression (2):

$$A = K_p \cdot \frac{\cos^{-1}(P \cdot P_d)}{|P||P_d|} \quad (2)$$

In Expression (2), $K_p$ denotes the proportional gain.

The amplitude determining device (amplitude determining unit) 15 multiplies the amplitude coefficient (amplitude amplification rate) A with the amplitude ratio rAmp obtained from the inverse model 13, in accordance with the following Expression (3):

$$\text{Amp} = A \cdot r\text{Amp} \quad (3)$$

Thus, the ultimate amplitude Amp of the AC voltage applied to the vibration type actuator is determined.

From the entered phase differences φ, amplitudes Amp, and frequencies f, the driving circuit 16 generates the AC voltages for driving the vibration type actuator. Although not shown in the figures, the driving circuit 16 includes an oscillation circuit, a phase shift circuit, and a voltage step-up circuit.

In the present embodiment, the driving frequency of the vibration type actuator, which corresponds to the control target 9, is controlled such that it is always near the resonance frequency of the vibration member S (i.e. to a frequency that is a little higher than the resonance frequency). In order to achieve this, a sensor using a piezoelectric element for detecting vibration is attached to the control target 9. By regulating the driving frequency f with the frequency regulator 17 such that the phase difference between the output of the sensor for vibration detection and one of the three AC voltages applied to the control target 9 is maintained at a predetermined value, the driving frequency of the vibration type actuator, that is, the control target 9, can be maintained near the resonance frequency of the vibration member S.

As described above, with the present embodiment, by using an inverse model utilizing a neural network in a vibration type actuator having redundancies and non-linearities, it is possible to determine the optimal voltage conditions to be applied to the vibration type actuator. Furthermore, it becomes possible to position the output shaft 6 of the vibration type actuator accurately at the target position within a short time (that is, with high efficiency).

In the present embodiment, when configuring a control circuit as shown in FIG. 1, it is also possible to realize the coordinate converter 11, the rotation axis determining device 12, the inverse model 13, the amplitude coefficient determining device 14, the amplitude determining device 15 and the frequency regulator 17 as software expressed as a program for a CPU or DSP, but it is also possible to realize them as digital circuits, such as gate arrays, or analog circuits. It is also possible to employ a combination of the above.

It should be noted that with the present embodiment, the amplitude coefficient is determined using the rule of proportional control in accordance with the deviation between the detected position and the target position, but there is no limitation to this, and it is also possible to carry out the control by a rule of integral control or a rule of derivative control.

Figure 5:
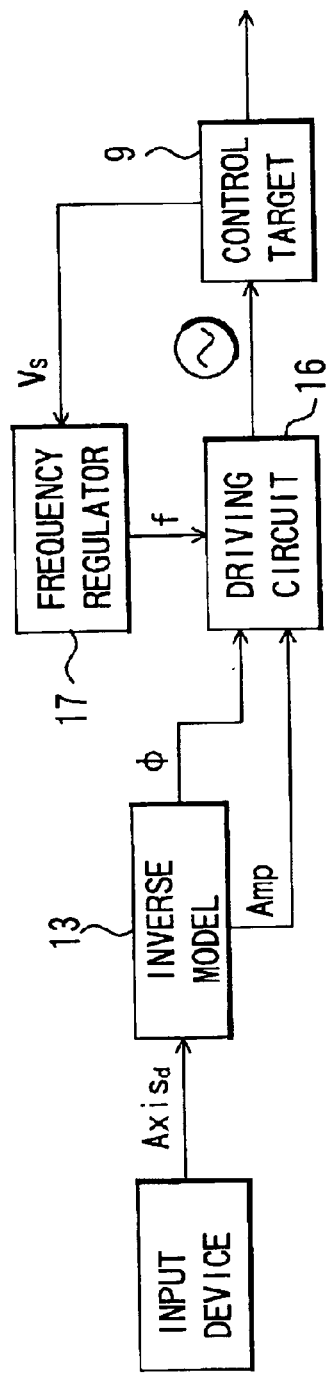
FIG. 5 is a functional block diagram illustrating the configuration of a feed-forward control circuit.

Furthermore, in the present embodiment, the moving member 4 is driven by a feedback control according to the detected position, but the present invention is not limited to this, and it is also possible to drive the moving member 4 by feed-forward control. That is to say, in the control blocks as shown in FIG. 5, it is also possible to enter the desired rotation axis information $\text{Axis}_d$ into the inverse model 13 by an input device, such as a joystick, and to drive the moving member 4 with phase differences φ and amplitudes Amp determined by the inverse model 13. It should be noted that in FIG. 5, elements corresponding to the blocks shown in FIG. 1 have been assigned the same numerals.

Figure 6:
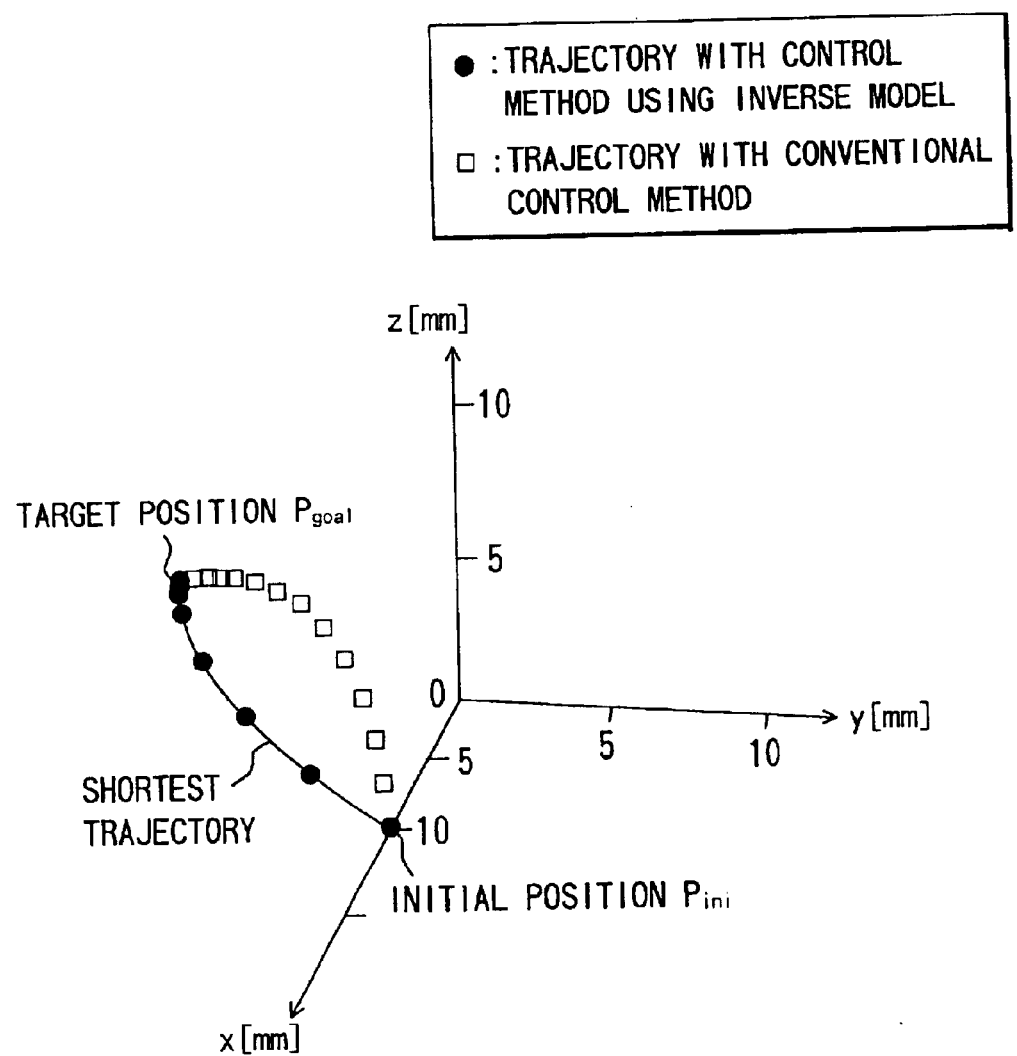
FIG. 6 is a diagram in which trajectories of the point at the tip of the output shaft 6 from the initial position $P_{ini}$ to the target position $P_{goal}$ are illustrated three-dimensionally.
Figure 7:
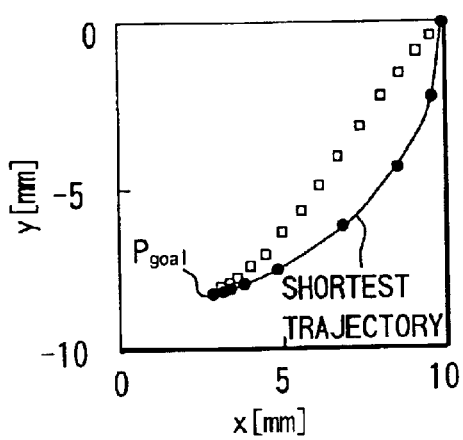
FIG. 7 shows planar projections of the trajectories shown in FIG. 6.
Figure 7:
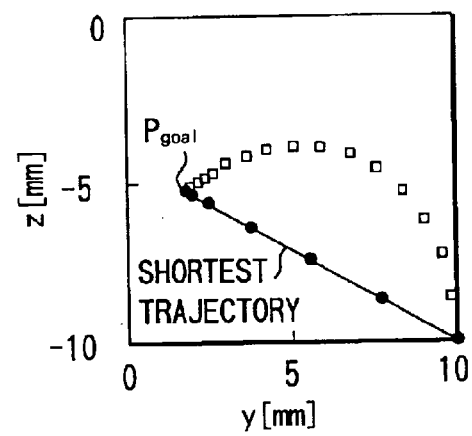
Figure 7:
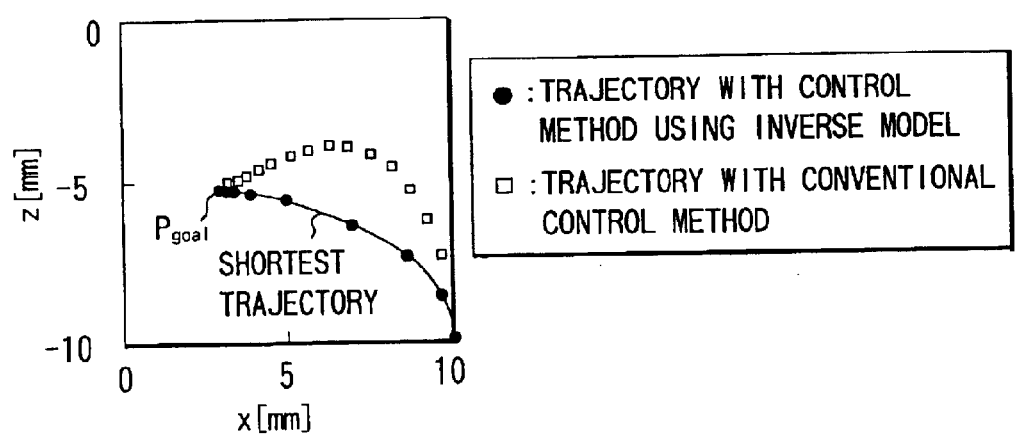

FIG. 6 is a diagram in which trajectories of the point at the tip of the output shaft 6 from the initial position $P_{ini}$ to the target position $P_{goal}$ are illustrated three-dimensionally. FIG. 7(A) is a projection of the trajectories in FIG. 6 onto the x-y plane, FIG. 7(B) is a projection of the trajectories in FIG. 6 onto the y-z plane, and FIG. 7(C) is a projection of the trajectories in FIG. 6 onto the z-x plane. In these drawings, the circular marks indicate the trajectory of the point at the tip of the output shaft 6 according to the control method using an inverse model 13 as shown for the present embodiment, the square marks indicate the trajectory of the point at the tip of the output shaft 6 according to the conventional control method, and the curve indicates the shortest trajectory from the initial position $P_{ini}$ to the target position $P_{goal}$.

As can be seen from these drawings, with a vibration type actuator performing the driving control using an inverse model as explained for the present embodiment, a driving control can be realized with which the driving trajectory can be controlled more accurately on the shortest trajectory (that is, with higher precision and efficiency) from the initial position $P_{ini}$ to the target position $P_{goal}$ than the driving trajectory according to the driving control by the conventional control method.

Embodiment 2

Figure 8:
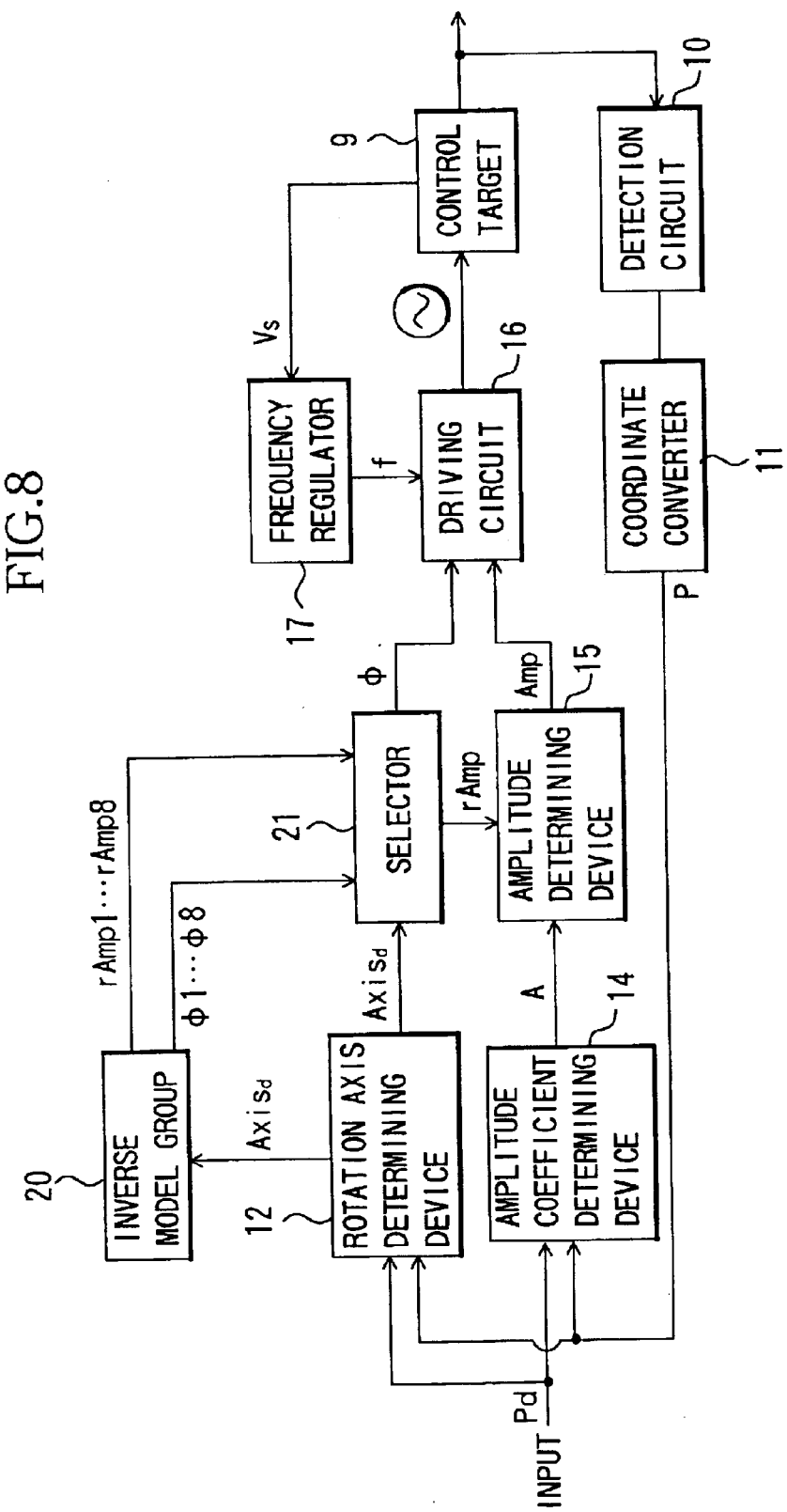
FIG. 8 is a functional block diagram of a control apparatus according to Embodiment 2 of the present invention.

With the above-described Embodiment 1, the phase differences and amplitudes of the three AC voltages are determined based on the rotation axis of the vibration type actuator with an inverse model using one neural network. Herein, for a vibration type actuator that drives with a combination of different kinds of vibration modes such as longitudinal vibration and lateral vibration, as used in Embodiment 1, the actuator characteristics depend on the direction of the vector of the rotation axis. The present embodiment is an application example of Embodiment 1 which is adapted for this. FIG. 8 is a functional block diagram of a control apparatus according to the present embodiment.

Other than the inverse model group 20 and the selector 21, structural elements shown in FIG. 8 are similar to that in Embodiment 1, so that they are assigned the same numerals and their further explanation is omitted. Furthermore, also the vibration type actuator, which corresponds to the control target 9, is the same as the vibration type actuator shown in FIG. 2 in Embodiment 1.

In the inverse model group 20, there are eight inverse models (i.e., a plurality of inverse models) in accordance with the directions of the rotation axis vector $Axis_d$ (i.e., the state of the rotation axis) of the vibration type actuator. Here, these eight inverse models are used depending on which quadrant of the rectangular coordinate system the rotation axis vector $Axis_d$ is located in. That is to say, depending on the sign of each of the directional components of the rotation axis vector $Axis_d$ (that is, the state of the rotation axis), one of the inverse models is selected and used. These eight inverse models are constitut d by a neural network as in Embodiment 1.

The learning process of the neural networks in the inverse model group 20 is performed by the same procedure as illustrated in FIG. 4 for Embodiment 1. Herein, the neural network that is trained is switched depending on the quadrant in which the rotation axis vector $Axis_d$ is located. As a result, an optimal neural network can be constructed for the quadrant in which the rotation axis vector $Axis_d$ is located.

The following is an explanation of the operation during the driving of the vibration type actuator. The rotation axis vector $Axis_d$ determined by the rotation axis determining device 12 is entered into all of the neural networks in the inverse model group 20. The phase differences $\phi 1$ to $\phi 8$ and the amplitude ratios rAmp1 to rAmp8 that have been determined respectively by the neural network are output from the inverse model group 20 to the selector 21.

The selector 21 judges in which quadrant the entered rotation axis vector $Axis_d$ is located in the rectangular coordinate system, and outputs the optimal one of the entered phase differences $\phi 1$ to $\phi 8$ as the phase difference $\phi$. That is to say, by using the inverse model selected as described above, the phases and amplitude ratios of the AC voltages supplied to the control target 9 are determined. Going through a similar process also for the amplitude ratios, the optimal one of rAmp1 to rAmp8 is output as rAmp. The driving circuit 16 generates the driving AC voltages in the same manner as in Embodiment 1, and drives the vibration type actuator serving as the control target 9. It should be noted that it is also possible that, after the classification of the driving state with the selector 21, the suitable inverse model is selected from the inverse model group 20, the rotation axis vector $Axis_d$ is input only into the selected inverse model, and the phases $\phi$ and amplitude ratios rAmp corresponding to the driving state are output.

As described above, by constructing neural networks corresponding to the direction of the rotation axis vector, and, when driving, selecting the neural network in accordance with the direction of the rotation axis vector, it is possible to perform accurate driving control even for a control target whose characteristics change for different directions of the rotation axis vector.

It should be noted that the present embodiment discriminates the directions of the rotation axis vectors into eight quadrants of the rectangular coordinate system, but there is no limitation to that, and needless to say, it is also possible to perform accurate driving control by discriminating as appropriate for any changing characteristics of the control target.

Embodiment 3

In Embodiment 2 as described above, a plurality of inverse models to be used are prepared in accordance with the directions of the rotation axis vector, and one of those inverse models is selected and used. Also in the present embodiment, a vibration type actuator with a similar structure as in the above embodiments is used, that is, one in which the relation between input and output is redundant and non-linear, but in this vibration type actuator, depending on the directions of the rotation axis vector, there may be no redundancies and linear driving control may be possible.

Furthermore, it is known that there are not only changes according to the quadrant in which the rotation axis vector is located, but there may also be changes in the characteristics within the same quadrant, depending on which of the rotation axis vector components is largest. In order to address this, the following structure is adopted for the present embodiment.

Figure 9:
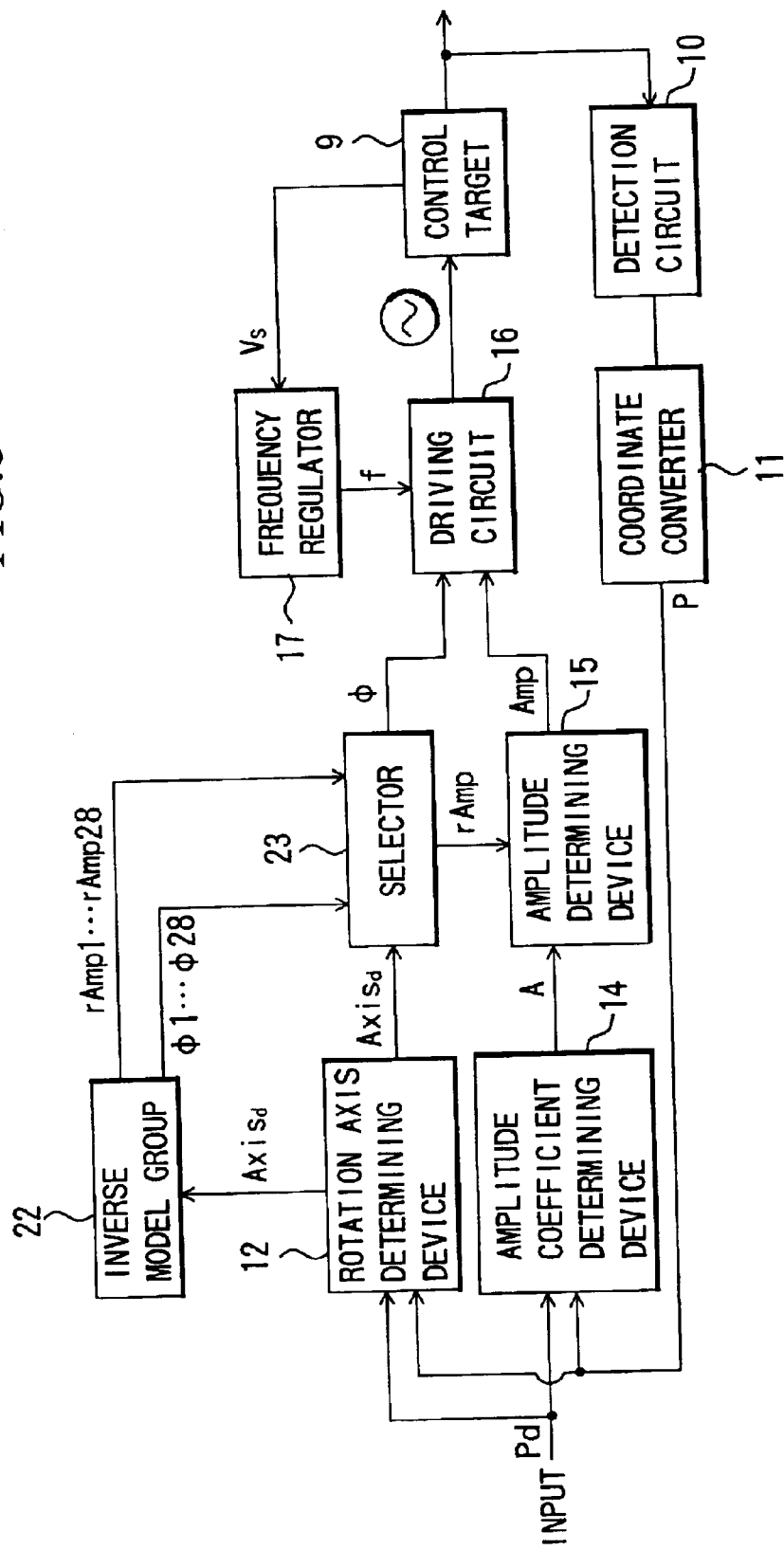
FIG. 9 is a functional block diagram of a control apparatus according to Embodiment 3 of the present invention.

FIG. 9 is a functional block diagram of a control apparatus in accordance with Embodiment 3 of the present invention. Other than the internal structure of the inverse model group 22 and the selector 23 in this functional block diagram, the structural elements are similar to those explained in Embodiment 2 with FIG. 8, so that in this embodiment only aspects that are different to Embodiment 2 are explained.

As noted above, the vibration type actuator used in this embodiment has the same structure as the vibration type actuator shown in FIG. 2 in the above embodiments.

With a vibration type actuator of the type that combines longitudinal vibration in z-axis direction and lateral vibrations in x-axis direction and y-axis direction, driving control may be possible by using only two of the three vibration modes, depending on the direction of the rotation axis vector. As can be seen in FIG. 2, the z-axis passes through a vicinity of the center of the elastic member 3 and through the moving member 4, whereas the x-axis and the y-axis cross one another at substantially right angles, and also cross the z-axis at substantially right angles. Thus, they define a so-called rectangular coordinate system.

If, for example, the moving member 4 is driven such that the rotation axis vector matches the x-axis, then the lateral vibration in y-axis direction and the longitudinal vibration in z-axis direction should be driven with a phase difference of p/2. And if the moving member 4 is driven such that the rotation axis vector matches the y-axis, then the lateral vibration in x-axis direction and the longitudinal vibration in z-axis direction should be driven with a phase difference of p/2. And furthermore, if the moving member 4 is driven such that the rotation axis vector matches the z-axis, then the two lateral vibrations in x-axis direction and in y-axis direction should be driven with a phase difference of p/2. It should be noted that these phase differences are selected to be either positive or negative, depending on whether the rotation axis vector is oriented in positive or negative direction of the axis (x-axis, y-axis or z-axis).

In the above-described three states, that is, when the rotation axis vector coincides with the x-axis direction, the y-axis direction or the z-axis direction, the phase difference is determined as described above, and driving is possible by setting the amplitudes to the same amplitude, so that the driving parameters can be determined without using a non-linear inverse model (corresponding to a non-linear model, that is, a non-linear converter), such as a neural network.

Furthermore, if the rotation axis is on the x-y plane, that is, if the z-axis component of the rotation axis vector is zero, then the phase difference can be determined from the quadrant in the x-y plane that includes the rotation axis. FIG. 10 illustrates the relation between the quadrants of the rotation axis vector and the phase difference. The vibration amplitude of the vibration modes are determined from the following Expression (4):

$$\begin{cases} Amp_{-x} = \dfrac{Axis_{d\_y}}{|Axis_d|} \\ Amp_{-y} = \dfrac{Axis_{d\_x}}{|Axis_d|} \\ Amp_{-z} = 1 \end{cases} \quad (4)$$

Thus, also when the rotation axis is located in the x-y plane, it is possible to determine the driving parameters without using a non-linear inverse model such as the neural network used in the previous embodiments.

It should be noted that if the rotation axis is not in one of the above-noted states, then it is necessary to use an inverse model adapted to a non-linear system, and for this a classification is performed using the table shown in FIG. 11.

In FIG. 11, the eight states that are classified by the same method as in Embodiment 2 based on the quadrant in which the rotation axis vector $Axis_d$ is located are referred to as "classes," and the three states that are classified by comparing the absolute value of the size of the components of the rotation axis vector $Axis_d$ and determining whether the maximum absolute value is the x-axis component, the y-axis component or the z-axis component are referred to as "sub-classes."

Thus, by classifying a total of 24 states, the settings for phase difference and amplitude ratio should be determined within the ranges for φ and rAmp shown in FIG. 11. In other words, in Embodiment 1 and Embodiment 2, all of the parameters of the three AC voltages were treated as changing parameters, whereas by classifying them with the approach of the present embodiment, it is possible to reduce the number of variable parameters, simplify the structure of the neural network, and facilitate the optimization by learning.

It should be noted that so far expressions related to phase have been represented by the phase difference between two AC voltages, but in FIG. 11 of the present embodiment, they are represented as phases. If they are represented as phases, the difference between phases can be determined by calculation, so that they substantially represent the same thing.

As described above, based on the direction of the rotation axis vector of the vibration type actuator, the present embodiment makes a distinction between states in which the phase and amplitude during driving are determined with a inverse model according to linear conversion (that is, corresponding to the linear converter), and states in which the phase and amplitude are determined with an inverse model according to a non-linear conversion (non-linear model). Moreover, when using the inverse model according to non-linear conversion, a classification into 24 states is made, depending on the direction and size of the rotation axis vector. Thus, the result is that a classification into 28 states is made, as shown in FIG. 12.

Figure 13:
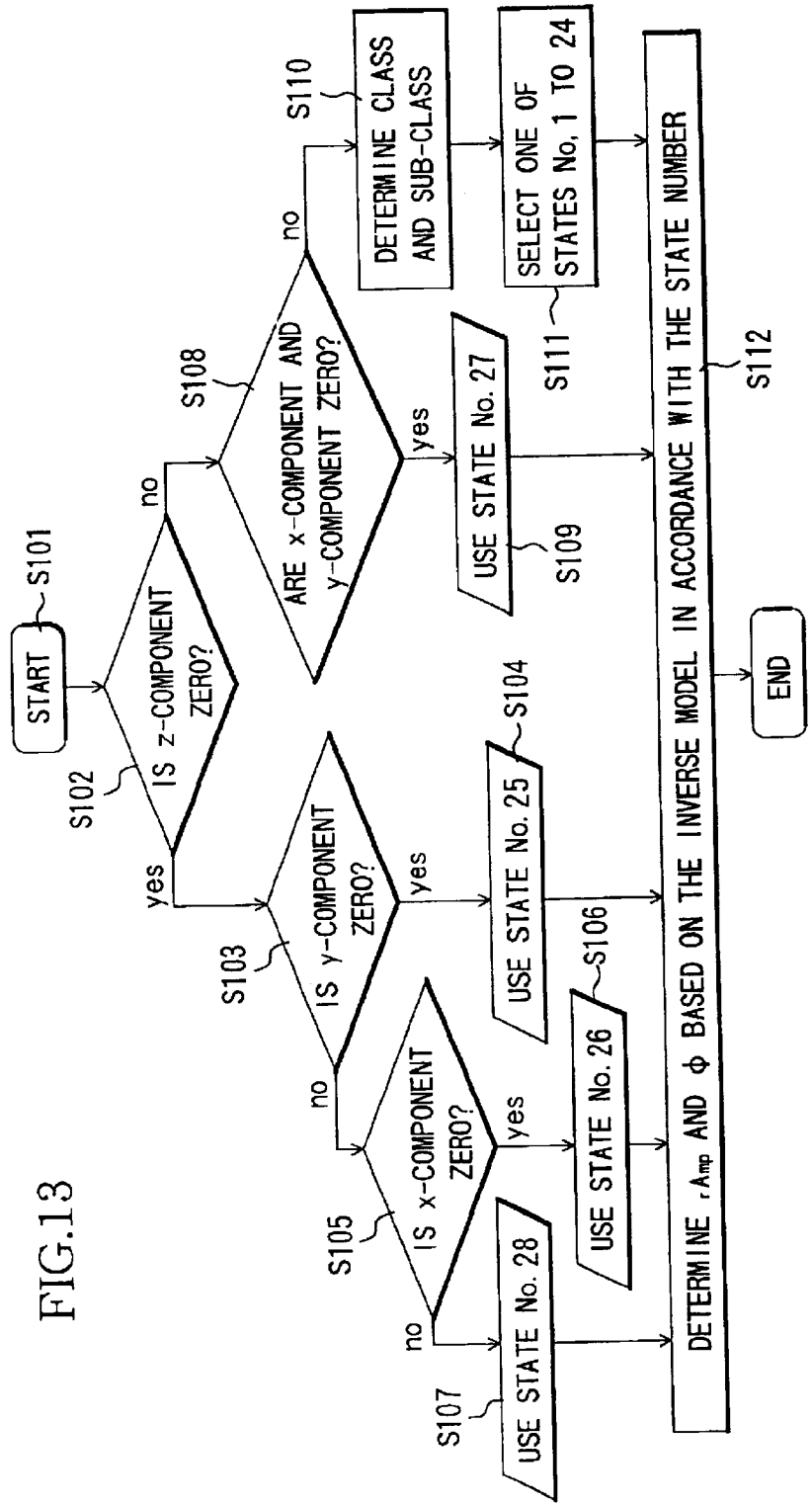
FIG. 13 is a flowchart of a method for determining the amplitude ratio rAmp and the phase $\phi$ with the selector 23.

The inverse model group 22 shown in FIG. 9 includes 28 inverse models corresponding to these 28 states. The amplitude ratios rAmp1 to rAmp28 and phases φ1 to φ8, which are output from the respective inverse models, are input into the selector 23. This selector 23 determines the amplitude ratio rAmp and the phase φ that are used for the driving control, in accordance with the above-described classification. FIG. 13 is a flowchart of a method for determining the amplitude ratio rAmp and the phase φ with the selector 23.

In FIG. 13, when the rotation axis vector has been determined, the classification of the state of the rotation axis vector begins (Step 101 (in FIG. 13, steps are denoted "S")). First, it is judged whether the z-axis component of the rotation axis vector is zero (Step 102). If it is zero, then the procedure advances to Step 103. At Step 103, it is judged whether they-axis component of the rotation axis vector is zero. If it is zero, then the procedure advances to Step 104. In this case, the rotation axis vector coincides with the x-axis, so that state No. 25 (see FIG. 12) is selected at Step 104.

If it has been determined at Step 103, that the y-axis component is not zero, then it is determined (at step 105) whether the x-axis component is zero. If the result is that the x-axis component is zero, then the rotation axis vector coincides with they-axis, so that state No. 26 is selected (Step 106).

If the x-axis component is not zero at Step 105, then the rotation axis vector is located in the x-y plane, so that the state No. 28 is selected (Step 107).

On the other hand, if at Step 102, the z-axis component is not zero, then the procedure advances to Step 108. At Step 108, it is judged whether both the x-axis component and the y-component are zero. If those two components are both zero, then the rotation axis vector coincides with the z-axis, so that the state No. 27 is selected at Step 109.

If at Step 108 neither the x-axis component nor the y-axis component are zero, then none of the x, y and z-components are zero. In that case, the procedure advances to Step 110, and the class and sub-class are determined depending on the direction of the rotation axis vector and on which component of the rotation axis vector direction has the largest absolute value (Step 110). The state number is selected from the numbers 1 to 24, based on the determined class and sub-class (Step 111).

Then, when a state number has been selected with the above-described method, the amplitude ratio rAmp entered into the amplitude determining device 15 and the phase φ entered into the driving circuit 16 are determined by using the inverse mod 1 corresponding to the selected state number in the selector 23 (Step 112).

The present embodiment as explained above exploits that the vibration type actuator is driven by longitudinal vibration in z-axis direction and lateral vibrations in x-axis direction and y-axis direction, and discriminates between states of the rotation axis vector in which the conditions (phase and amplitude) of the driving voltage can be determined by a linear conversion and states of the rotation axis vector in which the conditions (phase and amplitude) of the driving voltage must be determined by a non-linear conversion. Thus, the processing load imposed by the driving control of the vibration type actuator is alleviated, and a more precise driving control becomes possible.

Moreover, in the states in which a non-linear conversion is performed, a more detailed classification is performed than in Embodiment 1 or Embodiment 2, so that the number of variable parameters can be reduced, the structure of the neural networks is simplified, and also the learning process is facilitated. Furthermore, by using inverse models (non-linear models) constructed by the neural networks, the optimum parameters for carrying out the desired motion with high efficiency can be determined, and a highly precise driving control can be realized.

Embodiment 4

Figure 14:
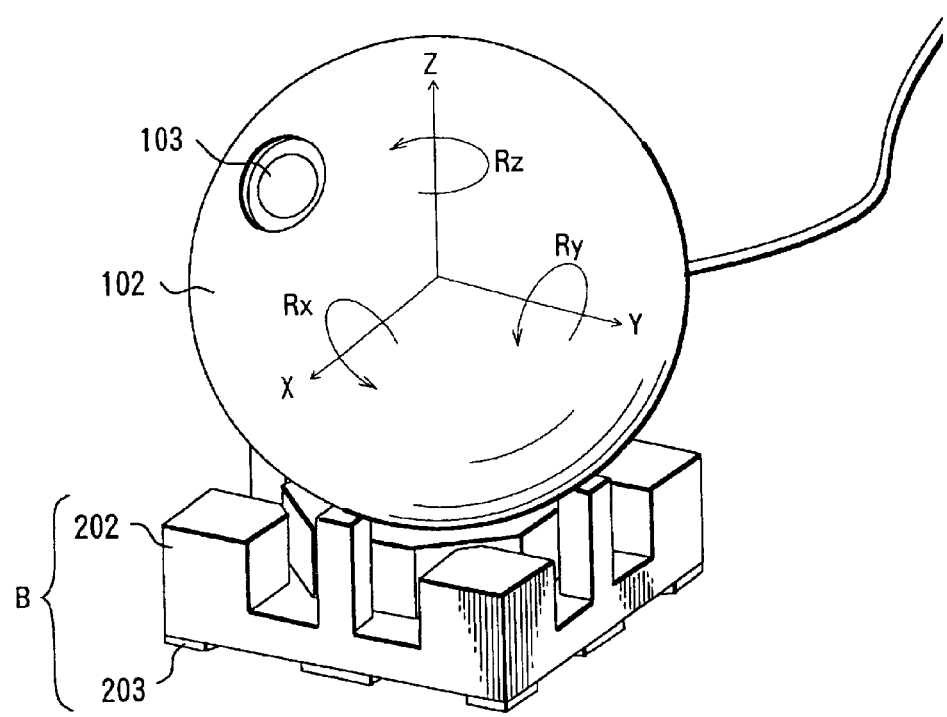
FIG. 14 is a perspective view of a vibration type actuator (planar vibration type actuator) used in Embodiment 4 of the present invention.

FIG. 14 is an oblique perspective figure of a vibration type actuator according to Embodiment 4 of the present invention. In the previous embodiments, a rod-shaped vibration member S of cylindrical shape was used, but in the present embodiment, a planar vibration member B is used, in which piezoelectric elements 203 are affixed to an elastic member 202, as shown in FIG. 14. A camera 103 is mounted in a spherical moving member 102, and the direction of the camera can be controlled with multiple degrees of freedom of movement. The following is an explanation of the driving principle.

Figure 15:
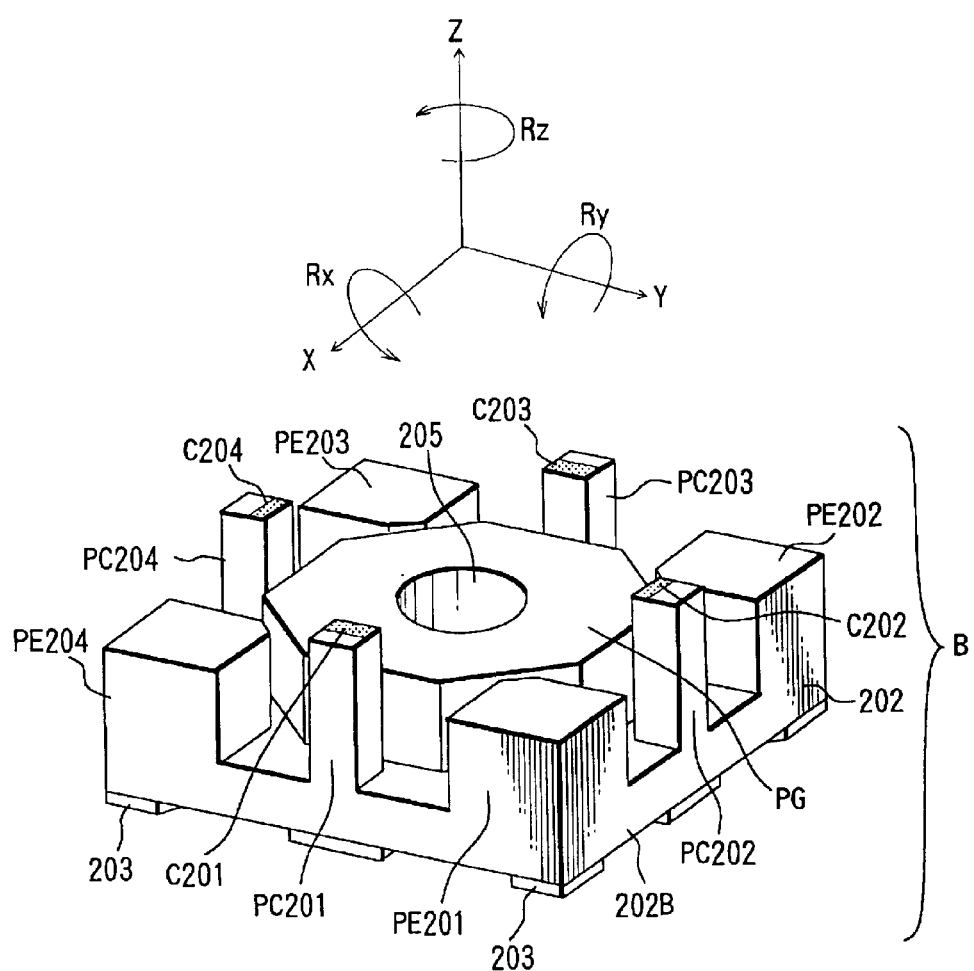
FIG. 15 is a perspective view of the vibration member B of the vibration type actuator of this embodiment.

FIG. 15 is an oblique perspective figure of the vibration member B. This vibration member B is made of an elastic member 202 formed of a metal such as phosphor bronze and piezoelectric elements 203 that are fastened by bonding to the elastic member 202.

The elastic member 202 has contact protrusions PC201 to PC204 that extend in z-axis direction from a substantially square plate-shaped portion 202B arranged in the x-y plane, as shown in FIG. 15. These contact protrusions have, at their end faces (which are substantially parallel to the x-y plane), driving points C201 to 204 contacting the moving member 102 to transmit a driving force.

Members having abrasion resistance, such as SUS that has been subjected to a surface oxidation treatment, are bonded to these driving points C201 to C204. Needless to say, there is no limitation to bonding these abrasion-resistant members, and it is also possible to subject the end faces of the contact protrusions PC201 to PC204 directly to a surface treatment to increase their abrasion resistance.

Furthermore, a protrusion PG having an end face that is substantially parallel to the x-y plane is formed substantially in the center of the elastic member 202, and the end face of this protrusion PG is arranged at a lower position in the height direction (z-axis direction) than the end faces of the contact protrusions PC201 to PC204.

Protrusions PE201 to PE204 having end faces that are also substantially parallel to the x-y plane are formed at the four corner portions on the x-y plane of the elastic member 202.

These protrusions PE201 to PE204 and the protrusion PG serve to match the natural vibration frequency of the natural vibration mode (explained below) and to enlarge the displacement of the driving points C201 to C204 on the contact protrusions PC201 to PC204.

A pressure-applying magnet 205 for attracting and executing pressure on the moving member 102 is arranged at the center of the elastic member 202 (that is, the center of the protrusion PG). With the structure of the above-described vibration type actuator, it is possible to rotate the moving member 102, just like the moving member 4 in Embodiment 1, around any rotation axis through excitation of the vibration member B by applying AC voltages to the piezoelectric elements 203.

Figure 16:
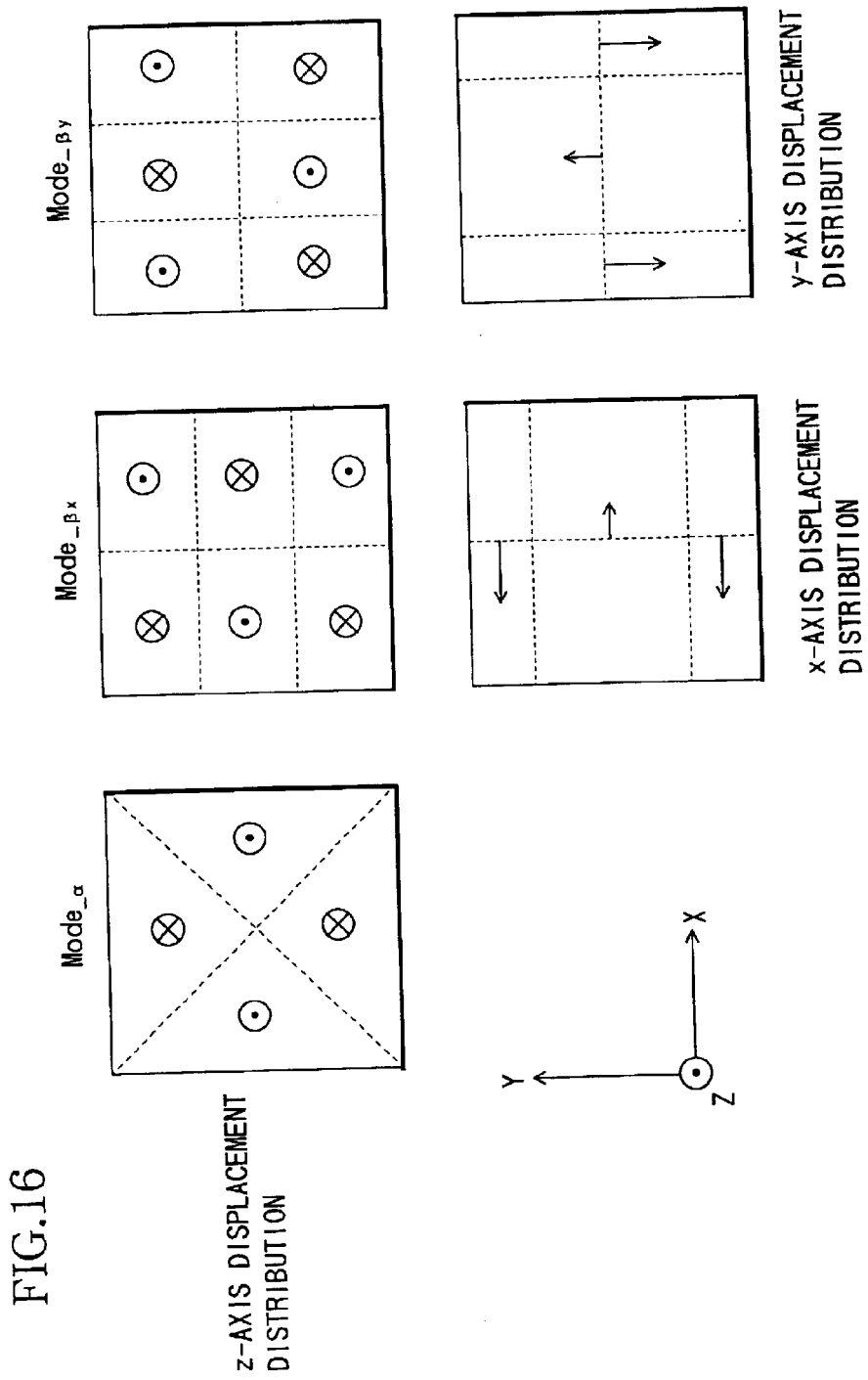
FIG. 16 is a schematic diagram illustrating the natural vibration modes excited in the vibration member B.

FIG. 16 is a schematic diagram of the natural vibration modes excited in the vibration member B. The arrows and the circled dots and crosses in FIG. 16 indicate the relative displacement in the natural modes. $Mode_\infty$, $Mode_{\beta x}$ and $Mode_{\beta y}$ that are shown here are all natural vibration modes that cause a deformation of the vibration member B outside the x-y plane. It should be noted that $Mode_{\beta x}$ and $Mode_{\beta y}$ are multiple root modes that are substantially perpendicular to one another.

FIG. 17 shows the structure of the piezoelectric elements 203-1 to 203-8 that are arranged on the rear side of the elastic member 202 and excite the natural vibration modes in the vibration member B. In FIG. 17, "+" and "−" denote the polarization directions of the piezoelectric elements 203. The terminals A, B and C and the lines connecting them with the piezoelectric elements 203 schematically indicate the driving signal application terminals and the way those terminals are connected. The elastic member 202 and the terminal G connected to it are at a common potential.

When an alternating signal (such as AC voltage) is applied to the terminal A, then the vibration member B is excited in $Mode_\alpha$ (see FIG. 16). When alternating signals with the same phase are applied to the terminals B and C, then the vibration member B is excited in $Mode_{\beta x}$. And when alternating signals with opposite phase are applied to the terminals B and C, then the vibration member B is excited in $Mode_{\beta y}$. By combining the natural vibration modes that are excited in the vibration member B, it is possible to generate driving forces around three substantially perpendicular axes, as well as any combination of these forces. Furthermore, a driving force can be induced to generate in the x-axis direction, the y-axis direction, and around the z-axis or any combination of these forces in the moving member 102 when its bottom fac is flat.

Needless to say, by applying the control apparatus and the control method of the foregoing embodiments to the vibration type actuator with the structure described in the present embodiment, it is possible to attain the same effects as with those foregoing embodiments.

Moreover, the vibration type actuator is not limited to the structure shown in the above embodiments. As long as it is a vibration type actuator in which a surface of a vibration member can be displaced in any of three perpendicular directions by exciting three different kinds of vibrations in an elastic member constituting the vibration member, it is possible to apply the control apparatuses and control methods of the foregoing embodiments.

It should be noted that in the foregoing embodiments, examples were given in which the periodic signals that are applied to the vibration type actuators are AC voltages, but there is no limitation to this, and the periodic signals may also be pulse signals. In this case, "phase of the periodic signal" means the phase between the pulse signals and "amplitude" means the height (amplitude) of the pulse signals.

Needless to say, the same effects as in the foregoing embodiments can also be attained by configuring a vibration type actuator system including a control apparatus for a vibration type actuator according to any of the foregoing embodiments, and a vibration type actuator whose drive is controlled by periodic signals supplied from this control apparatus.

With the present invntion as explained above, a control apparatus for a vibration type actuator, a vibration type actuator system and a vibration type actuator control method are provided, with which at least three kinds of vibrations are excited, and a desired motion can be carried out with high efficiency, even in the case of redundancies and non-linearities.

While preferred embodiments have been described, it is to be understood that modification and variation of the present invention may be made without departing from the scope of the following claims.

What is claimed is:

1. A control apparatus for a vibration type actuator, the vibration type actuator comprising a rotatable moving member, an elastic member contacting the moving member, and an electro-mechanical energy conversion element exciting at least three different kinds of vibrations in the elastic member by supplying at least three periodic signals with different phases, the control apparatus supplying the periodic signals to the vibration type actuator in order to rotate the moving member to a target position, comprising:

a rotation axis determining unit which determines a rotation axis for rotating the moving member to the target position;

a parameter determining unit which determines, by using an inverse model, phases and amplitudes of the periodic signals for rotating the moving member around the rotation axis determined by the rotation axis determining unit; and a control circuit which supplies the periodic signals having the phases and amplitudes determined by the parameter determining unit to the electro-mechanical energy conversion element.

2. The control apparatus for a vibration type actuator according to claim 1, wherein the rotation axis determining unit determines a rotation axis for rotating the moving member to the target position with a minimal driving amount.

3. The control apparatus for a vibration type actuator according to claim 1, further comprising:

a position detection unit which detects a current position of the moving member;

wherein the rotation axis determining unit determines the rotation axis based on the target position and the current position detected by the position detection unit.

4. The control apparatus for a vibration type actuator according to claim 1, wherein the parameter determining unit includes a plurality of inverse models respectively corresponding to each state of the rotation axis;

wherein one of the plurality of inverse models is selected in accordance with the state of the rotation axis determined by the rotation axis determining unit; and wherein the phases and amplitudes of the periodic signals are determined by using the selected inverse model.

5. The control apparatus for a vibration type actuator according to claim 4, wherein at least one of the plurality of inverse models is a non-linear model using a non-linear converter which performs a non-linear conversion.

6. The control apparatus for a vibration type actuator according to claim 5, wherein at least one of the plurality of inverse models is a linear model using a linear converter which performs a linear conversion.

7. The control apparatus for a vibration type actuator according to claim 1, wherein the inverse model is a non-linear model using a non-linear converter which performs a non-linear conversion.

8. The control apparatus for a vibration type actuator according to claim 5, wherein the non-linear converter is constructed of a neural network.

9. The control apparatus for a vibration type actuator according to claim 6, wherein the at least three different kinds of vibrations include a longitudinal vibration in a z-axis direction passing through a vicinity of a center of the elastic member and the moving member, and lateral vibrations in an x-axis direction and a y-axis direction which are substantially perpendicular to one another as well as to substantially perpendicular to the z-axis direction; and wherein, when a vector of the rotation axis determined by the rotation axis determining unit substantially coincides with the z-axis, or when the vector is located in an x-y plane, then the linear model is selected from the plurality of inverse models, and in all other cases, the non-linear model is selected.

10. The control apparatus for a vibration type actuator according to claim 1, further comprising:

an amplification rate determining unit which determines amplitude amplification rates of the amplitudes of the periodic signals, based on the current position and the target position of the moving member; and an amplitude determining unit which determines as the amplitude of each of the periodic signal, a value obtained by multiplying the amplitude determined with the parameter determining unit with the amplitude amplification rates.

11. A vibration type actuator system, comprising:

the control apparatus for a vibration type actuator according to claim 1; and a vibration type actuator whose drive is controlled by the periodic signals supplied from the control apparatus.

12. A method for controlling a vibration type actuator, the vibration actuator comprising a rotatable moving member, an elastic member contacting the moving member, and an electro-mechanical energy conversion element exciting at least three different kinds of vibrations in the elastic member by supplying at least three periodic signals with different phases, the control method supplying the periodic signals to the vibration type actuator in order to rotate the moving member to a target position, comprising:

a first step of determining a rotation axis for rotating the moving member to the target position;

a second step of determining, by using an inverse model, phases and amplitudes of the periodic signals for rotating the moving member around the rotation axis determined in the first step; and a third step of supplying the periodic signals having the phases and amplitudes determined in the second step to the electro-mechanical energy conversion element.

13. The method for controlling a vibration type actuator according to claim 12, wherein in the first step, the rotation axis is determined, with which the moving member is rotated to the target position with a minimal driving amount.

14. The method for controlling a vibration type actuator according to claim 12, wherein in the second step, one of a plurality of inverse models respectively corresponding to each state of the rotation axis is selected in accordance with the state of the rotation axis determined in the first step, and the phases and amplitudes of the periodic signals are determined by using the selected inverse model.

15. The method for controlling a vibration type actuator according to claim 14, wherein a non-linear model constructed of a neural network and using a non-linear converter performing a non-linear conversion is used for at least one of the inverse models.

* * * * *

UNITED STATES PATENT AND TRADEMARK OFFICE
CERTIFICATE OF CORRECTION

PATENT NO. : 6,885,132 B2
APPLICATION NO. : 10/669429
DATED : April 26, 2005
INVENTOR(S) : Kenjiro Takemura et al.

It is certified that error appears in the above-identified patent and that said Letters Patent is hereby corrected as shown below:

COLUMN 4
    Line 23, "th" should read --the--.

COLUMN 9
    Line 28, "constitut d" should read --constituted--.

COLUMN 12
    Line 25, "they-axis" should read --the y-axis"; and
    Line 49, "mod 1" should read --model--.

COLUMN 13
    Line 64, "Mode$_{60}$," should read --Mode$_\alpha$,--.

COLUMN 14
    Line 27, "fac" should read --face--;
    Line 35, "actuator-in" should read --actuator in--; and
    Line 56, "inv ntion" should read --invention--.

Signed and Sealed this

Eleventh Day of July, 2006

JON W. DUDAS
*Director of the United States Patent and Trademark Office*